United States Patent
Jensen et al.

(10) Patent No.: US 12,127,625 B2
(45) Date of Patent: Oct. 29, 2024

(54) ARTICLE OF FOOTWEAR

(71) Applicant: Ecco Sko A/S, Bredebro (DK)

(72) Inventors: Frank Jensen, Bredebro (DK); Ejnar Truelsen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 120 days.

(21) Appl. No.: 16/862,388

(22) Filed: Apr. 29, 2020

(65) Prior Publication Data

US 2020/0345103 A1 Nov. 5, 2020

(30) Foreign Application Priority Data

Apr. 30, 2019 (EP) ..................................... 19171715

(51) Int. Cl.
- *A43B 13/14* (2006.01)
- *A43B 9/16* (2006.01)
- *A43B 9/18* (2006.01)

(52) U.S. Cl.
CPC ................ *A43B 13/14* (2013.01); *A43B 9/16* (2013.01); *A43B 9/18* (2013.01)

(58) Field of Classification Search
CPC .............. A43B 13/14; A43B 9/16; A43B 9/18
See application file for complete search history.

(56) References Cited

U.S. PATENT DOCUMENTS

| | | | | | |
|---|---|---|---|---|---|
| 1,206,914 | A | * | 12/1916 | Price ......................... | A43B 3/02 12/142 E |
| 3,190,016 | A | * | 6/1965 | Hansjosten ............ | A43B 13/12 36/14 |
| 3,447,251 | A | * | 6/1969 | Drexler ................ | B29D 35/065 425/119 |
| 3,510,968 | A | * | 5/1970 | Yarrison .............. | B29D 35/061 12/146 B |
| 3,812,604 | A | * | 5/1974 | Sato ......................... | A43B 9/18 12/142 RS |
| 4,245,406 | A | * | 1/1981 | Landay .................... | A43B 5/00 428/116 |
| 4,333,193 | A | * | 6/1982 | Bartneck .............. | B29D 35/065 36/16 |

(Continued)

FOREIGN PATENT DOCUMENTS

| CN | 101856161 | 10/2009 |
|---|---|---|
| CN | 102578748 | 7/2012 |

(Continued)

OTHER PUBLICATIONS

European Search Report dated Oct. 11, 2019 from the European Patent Office in EP Application No. 19171715.6.

(Continued)

*Primary Examiner* — Jila M Mohandesi
(74) *Attorney, Agent, or Firm* — Lee & Hayes, P.C.

(57) ABSTRACT

The present invention relates to an article of footwear comprising an upper having a first ground facing surface; a primary sole part having a first foot facing surface defining a first volume for receiving an injected material in a cross-sectional area between the first proximal surface and the first distal surface of the upper, a second ground facing surface and a peripheral surface; and a secondary sole part having a second foot facing surface and a second ground facing surface, where the secondary sole part and extends between the upper and the primary sole part.

14 Claims, 2 Drawing Sheets

(56) References Cited

U.S. PATENT DOCUMENTS

| | | | | | |
|---|---|---|---|---|---|
| 4,399,620 | A | * | 8/1983 | Funck | A43B 13/12 36/28 |
| 4,407,034 | A | * | 10/1983 | Ralphs | B29D 35/082 264/250 |
| 4,494,266 | A | * | 1/1985 | Bartneck | A43B 9/16 36/16 |
| 4,651,444 | A | * | 3/1987 | Ours | B29D 35/084 12/142 T |
| 5,667,738 | A | * | 9/1997 | Krajcir | B29D 35/061 264/572 |
| 5,890,248 | A | * | 4/1999 | Gee | B29D 35/10 12/146 B |
| 5,992,054 | A | * | 11/1999 | Rauch | A43B 7/125 12/142 E |
| 6,026,595 | A | * | 2/2000 | Curry | A43D 999/00 36/154 |
| 6,170,177 | B1 | * | 1/2001 | Frappier | A43D 3/00 12/21 |
| 6,226,895 | B1 | * | 5/2001 | McClelland | A43B 15/00 36/71.5 |
| 6,497,057 | B1 | * | 12/2002 | Lee | A43B 1/0009 36/35 R |
| 6,787,089 | B2 | * | 9/2004 | Liu | B29D 35/10 264/250 |
| 7,380,353 | B2 | * | 6/2008 | Feller | A43B 1/0072 36/76 R |
| 7,946,060 | B2 | * | 5/2011 | Rosenbaum | A43B 13/16 36/35 B |
| 8,127,468 | B2 | * | 3/2012 | Morgan | A43B 13/12 12/142 T |
| 8,640,291 | B2 | * | 2/2014 | Fleming | A43B 9/12 12/142 T |
| 8,800,085 | B2 | * | 8/2014 | Sussmann | B29D 35/0018 12/142 E |
| 8,809,408 | B2 | * | 8/2014 | Yu | A43B 7/1415 521/142 |
| 9,021,721 | B2 | * | 5/2015 | McCarron | A43B 21/26 36/28 |
| 9,060,568 | B2 | * | 6/2015 | Dirsa | A43B 13/04 |
| 2010/0126044 | A1 | * | 5/2010 | Davis | A43B 7/144 36/43 |
| 2011/0271553 | A1 | | 11/2011 | McCarron | |
| 2014/0325876 | A1 | | 11/2014 | Dodge | |

FOREIGN PATENT DOCUMENTS

| | | |
|---|---|---|
| CN | 102892322 | 1/2013 |
| CN | 106037149 | 10/2016 |
| EP | 2389081 A1 | 11/2011 |
| EP | 2 574 251 A2 | 4/2013 |
| EP | 2 574 251 A3 | 7/2013 |
| KR | 20-2009-009068 | 9/2009 |
| WO | WO-2010/003414 A1 | 1/2010 |
| WO | WO-2010/003414 A8 | 1/2010 |
| WO | 2010085485 A1 | 7/2010 |

OTHER PUBLICATIONS

Chinese Office Action for corresponding China Patent Application No. 202010360805.2 dated Dec. 22, 2023, 8 pages.

EP Communication for corresponding EP Patent Application No. 19171715.6 dated Sep. 8, 2023, 6 pages.

* cited by examiner

ARTICLE OF FOOTWEAR

CROSS REFERENCE TO RELATED APPLICATIONS

This application is a nonprovisional utility application, which claims the benefit of priority of European Application No. 19171715.6, filed Apr. 30, 2019, the contents of which are incorporated herein by reference in its entirety.

TECHNICAL FIELD

The present disclosure relates to an article of footwear comprising a primary sole part and a secondary sole part.

BACKGROUND

In shoe making, there are various ways of obtaining an assembly between a sole and the upper of the shoe. Commonly there are two ways that are mostly used, where the first method is cementing, where an already produced sole, i.e. midsole and/or outsole, is adhered to the bottom side of the upper using an adhesive layer to secure the sole to the upper. A second method may e.g. be seen as direct injection moulding, where an upper is position in a direction injection moulding machine, and the sole of the shoe is injected using an expanding polymeric material into a mould that defines the outer part of the sole, and forms the sole while attaching the injected sole with regards to the upper, without the use of adhesive materials.

Traditionally the different techniques have a different appearance, as a cemented sole may be constructed out of a plurality of materials, such as polymer, natural rubber, leather, while a direct injected sole is always constructed at least in part of a polymeric material, where at least part of the external surface of the injected sole material is visible. Thus, it has traditionally been difficult to construct a direct injected shoe having e.g. a leather outsole, leather heel, leather trimmings, or other types of trimmings that are not based on polymeric materials. Another issue may be that the bonding between leather parts of the shoe and the injected material may be not be of an acceptable quality for the shoe manufacturer.

Thus, there is a need for an article of footwear where the advantages of cemented shoes may be utilized in shoes where the sole assembly is direct injection moulded.

SUMMARY

In accordance with the present description, there is provided an article of footwear comprising: an upper having a first ground facing surface; a primary sole part having a first foot facing surface defining a first volume for receiving an injected material in a cross sectional area between the first proximal surface and the first distal surface of the upper, a second ground facing surface and a peripheral surface; a secondary sole part having a second foot facing surface and a second ground facing surface, where the secondary sole part extends between the upper and the primary sole part.

BRIEF DESCRIPTION OF THE DRAWINGS

The following is an explanation of exemplary embodiments with reference to the drawings, in which.

DETAILED DESCRIPTION

Figure 1:
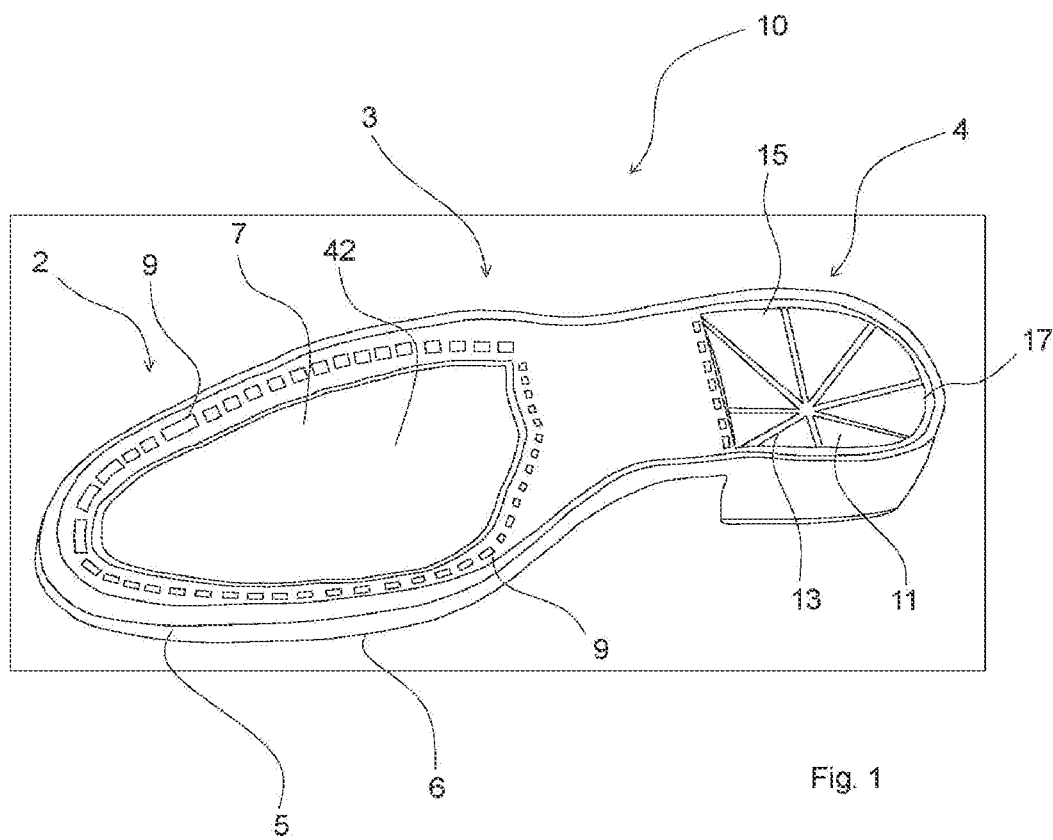
FIG. 1 shows a perspective view of a primary sole part.

In accordance with the present description, there is provided an article of footwear comprising: an upper having a first ground facing surface; a primary sole part having a first foot facing surface defining a first volume for receiving an injected material in a cross sectional area between the first proximal surface, i.e. the first foot facing surface and the first distal surface, i.e. the ground facing surface of the upper, a second ground facing surface and a peripheral surface; a secondary sole part having a second foot facing surface and a second ground facing surface, where the secondary sole part ad extends between the upper and the primary sole part.

By providing a primary sole part having a first volume for receiving injected material, it may be possible to use the injected material to attach the primary sole part to the upper. Furthermore, as the injected material may be received in the first volume, the injected material may be capable of providing a layer of material between the primary sole part and the upper, where the injected material may improve a predefined characteristic of the article of footwear.

One advantage with using direct injection moulded material in shoes, is that the sole may be more comfortable than e.g. a shoe having a leather sole which is cemented or sewn to the upper, as the injected material may provide cushioning, which may improve comfort.

The ground facing surface of the upper may be seen as a distal surface of the upper, while the proximal surface of the primary part may be seen as the upper facing surface of the primary part. The terms distal and proximal may be defined in relation to the foot, so a distal surface may be seen as a surface facing away from the foot, while a proximal surface may face the foot.

The primary sole part may be any kind of sole part that may provide the article of footwear with an aesthetic look and/or a functional characteristic, where the secondary sole part may provide the article of footwear with a functional characteristic such as shock absorption between the ground facing surface of the upper and the primary sole part. The provision of a primary sole part may e.g. mean that the primary sole part may be provided in a material that is durable, and capable of tolerating contact with the ground, where the secondary sole part may be provided in a material that provides a softer feel to the article of footwear. Thus, the primary sole material and the secondary sole materials may be made of different materials, having different properties.

The secondary sole part may fill out the first volume of the first foot facing surface, where the injected material may constitute the secondary sole part when the article of footwear has been constructed. The secondary sole part may provide the article of footwear with a layer which is positioned between the upper and the ground, so that the secondary sole part may e.g. provide a dampening layer in the sole of the article of footwear. The second layer may fill out at least part of the first volume, and where the second layer is positioned between the primary sole part and the first ground facing surface of the upper. The injected material may bond to the upper facing surface of the primary sole part when the injected material expands and cures, so that the injected material fills out the first volume Within the meaning of the present invention the cross-sectional area between the first proximal surface and the first ground facing surface of the upper may be seen in a vertical direction in a resting position of the article of footwear. Thus, the cross-sectional area may be seen as extending in a vertical direction between the two surfaces.

Within the context of the present description the term volume may be seen as an amount of space, measured in cubic units, such as cubic millimetres ($mm^3$), cubic centimetres ($cm^3$), etc. where a three-dimension object of a fluid and/or a solid may occupy the volume. The volume may e.g. be defined as an open volume and/or a closed volume.

The secondary sole part may be seen as a part of an article of footwear where the secondary sole part bonds the primary sole part to the ground facing surface of the upper. The primary sole part may have a first hardness and the secondary sole part may have a second hardness, where the first hardness may be greater than the second hardness. The first hardness of the first sole material may be utilized to improve traction by providing traction elements on the ground facing surface of the primary sole part, to improve durability by providing the primary sole in a material that is capable of tolerating friction between the ground surface and the ground facing surface of the first part. The secondary sole part may be provided in a material that has a second hardness that is lower than the first hardness, where the secondary sole part may be positioned between the foot of the wearer, when used, and the primary sole part and the ground. Thus, the softer material may improve the comfort of the article of footwear by providing a dampening layer that can absorb shocks that occur during gait.

The article of footwear may e.g. be manufactured where the upper and the primary sole part may be premanufactured, where the construction of the article of footwear is finalized by providing the injected material inside the first volume, and positioning the upper in its correct position relative to the primary sole part, so that the injected material expands, and fills up the first volume, and thereby creating the secondary sole part. The primary sole part and/or the secondary sole part may comprise a thermoplastic polymer, such as thermoplastic rubber (TPR), Thermoplastic polyurethane (TPU), or polyurethane (PU), or a combination thereof. The secondary sole material may be a polyurethane foam, which expands into a mould cavity. The primary sole material may be a thermoplastic polyurethane.

In one exemplary embodiment, the primary sole part defines a mould cavity of the secondary sole part, where the first volume of the primary sole part may define the mould cavity of the secondary sole part. If the primary sole part has a second and/or a third volume which is in fluid communication with the first volume, the second volume and/or the third volume may be part of the first volume. Thus, the second volume and/or the third volume may define parts of the mould cavity of the secondary sole part.

In one exemplary embodiment, the primary sole part and/or the ground facing surface of the upper defines the entire mould cavity of the secondary sole part. Thus, when the secondary sole part is injection moulded the mould cavity of the direct injection moulding holds the primary sole part in its position, while the first volume of the primary sole part defines the outer surface of the secondary sole part. The ground facing surface of the upper may define an upper part of the mould cavity for the secondary sole part, while the primary sole part may define a peripheral part and a bottom part of the of the mould cavity.

In one exemplary embodiment the sole assembly of the shoe may be a layered construction, where the primary sole part may be an outsole for an article of footwear, where the primary sole part may define the part of the footwear that comes into contact with the ground during normal use.

In one exemplary embodiment the sole assembly of the shoe may be a layered construction where the secondary sole part may be a midsole for an article of a footwear, where the midsole may be primarily for shock absorption and/or to provide the article of footwear with a layer that may dampen the contact between the foot of the wearer and the ground.

In one embodiment the first volume may be defined as a cubic space between the sole facing surface of the upper and the foot facing part of the primary sole part. An upper part of the first volume may abut the ground facing surface of the upper, and a lower part of the first volume may abut the foot facing surface of the primary sole part.

In one embodiment a peripheral limit of the first volume, the second volume and/or the third volume may be defined by a side wall, where the side wall may be part of the primary sole part. The first volume, the second volume and/or the third volume may be an opening in an upper part of the primary sole part, and where the opening is closed in a bottom and/or a side part of the opening. Thus the first volume, the second volume and/or the third volume, may be limited by a side wall and/or a bottom wall having an inner surface, so that the injected material can penetrate the opening, so that when the injected material cures, the injected material may bond to inner surface of the side wall and/or the bottom wall of the opening.

In one exemplary embodiment, the primary sole part may have a peripheral boundary, where the peripheral boundary of the primary sole part may abut a lower part of the upper, where the peripheral boundary may abut the lower part of the upper along the entire inner and/or upper part of the peripheral boundary.

In one exemplary embodiment, the secondary sole part may comprise a shank, where the shank may be attached to the article of footwear using the secondary sole part. The shank may be embedded in the secondary sole part, where the secondary sole part surrounds parts of or the entire shank. The shank may be bound to the secondary sole part, and may be positioned in an area between the ground facing surface of the upper and the secondary sole part and/or the primary sole part.

In one exemplary embodiment the foot facing surface may comprise one or more cavity defining a second volume for receiving an injected material. The cavity may provide a cavity surface area, where the cavity may have a side and/or a bottom wall, where the shape of the cavity may be adapted to increase the surface area where the injected material may bond with the primary sole part. The second volume may be one or more cavities that may be provided in the foot facing surface of the primary sole part, where the second volume may provide an increased surface area in the upper facing surface of the primary sole part. Thus, the injected material and/or the secondary sole part may penetrate the second volume from the first volume, so that the injected material may bond with the surface area of the cavity. I.e. the second volume may provide an increased surface area of the foot facing surface of the primary sole part, allowing the bond between the primary sole part and the secondary sole part to be enhanced, as the second volume provides a an increased surface area where the secondary sole part may bond with the primary sole part.

Within the meaning of the present description the cavity may be a compartment, a hole a chamber, an opening and/or an receptacle, or any type of hollow space that allows for the access of a material that may be injected into the space.

The second volume may be in fluid communication with the first volume, so that when the injected material is introduced into the first volume, the injected material may flow into the second volume via the first volume during expansion or under pressure.

In one exemplary embodiment secondary sole part is direct injection moulded into the first volume. The injected material may form the secondary sole part, where the injected material may be introduced into the first volume of the primary sole part, and when the injected material has expanded and cured the injected material forms the secondary sole part. The use of direct injection moulding for forming the secondary sole part means that the secondary sole part will adapt to the form of the primary sole part and the ground facing surface of the upper. This means that the injected material will fill out the first volume so that the injected material will penetrate and expand into all parts of the first volume, and possibly all parts of the second volume and/or the third volume if these are present.

The article of footwear may be manufactured using direct injection moulding injection equipment, where the upper may and the primary sole part may be positioned in a mould, and where the injected material may be positioned inside the first volume prior to closing the mould. Thus, the injected material may expand and cure inside the mould, so that the upper and/or the primary sole part are maintained in their position during the expansion of the injected material, so that when the injected material cures, the injected material bonds the primary sole part to the upper, via a secondary sole part, i.e. the cured injected material.

In one exemplary embodiment the secondary sole part extends from the first ground facing surface of the upper to the first foot facing part of the primary sole part, and/or where the secondary sole part defines a second foot facing surface that is attached to the first ground facing surface of the upper and a second ground facing surface that is attached to the first foot facing surface of the primary sole part. The secondary sole part may be adapted to attach the primary sole part to the upper, where the secondary sole part extends in a vertical direction between the ground facing part of the upper towards the first foot facing surface of the primary sole part. Thus, the secondary sole part may bond to the first foot facing surface and the first ground facing surface. The secondary sole part may extend from a medial side primary sole part to a lateral side of the primary sole part, so that the primary sole part is attached to the upper from a medial side and continuously towards a lateral side.

In one exemplary embodiment the second ground facing surface defines an attachment area configured to accommodate a tertiary sole part, optionally where the tertiary sole part has a third foot facing surface and a third ground facing surface. Alternatively, the attachment area may be positioned on a surface of the primary sole part that faces away from the upper, e.g. on the second ground facing surface or on a peripheral surface of the primary sole part.

The tertiary sole part may e.g. be a layer of leather, rubber, or any suitable outsole material for a shoe. The tertiary sole part may be of a material that is different from the material of the primary sole part and/or the secondary sole part, where the tertiary sole part may provide the primary sole part with a different characteristic in the attachment area. The attachment area may be positioned the second ground facing surface, where an application of the tertiary sole part may e.g. provide ground facing surface where the tertiary sole part is positioned between the ground and the second ground facing surface of the primary sole part. Thus, the tertiary sole part may provide a different a ground facing surface than the primary sole part.

The height of the primary sole part may be lower in the attachment area than the ground contacting surface, so that the attachment area, i.e. the attachment surface of the primary sole part, is higher in a vertical direction than the ground contacting surface. I.e. the ground contacting surface is closed to the ground than the attachment area, when the primary sole part is positioned with the ground contacting surface on the ground. Thus, if a layer of tertiary sole part is applied to the attachment area or to the attachment surface the height of the tertiary sole part may be equal to or higher than the ground contacting surface. In one embodiment the tertiary sole part may form a part of the ground contacting surface of the primary sole part. The, attachment area may have a surface that has a first normal, and where the ground contacting surface has a second normal, where the first normal and the second normal may be parallel to each other.

Thus, the attachment area may e.g. be a groove that is formed in the ground facing surface of the primary sole part, where the groove can accommodate a tertiary sole part. The tertiary sole part may e.g. be adhered to the primary sole part, or the primary sole part may be injection moulded around the tertiary sole part.

The tertiary sole part may define an outer side wall of the heel, where the tertiary sole part may be inserted into an attachment area of the heel, where the attachment area is may be a groove or a decrease in the size of the side wall of the heel, where the groove can accommodate the tertiary sole part. Thus, the tertiary sole part may define an outer surface of the heel of the sole assembly, giving the heel a different aesthetic look, than if the outer wall of the heel of the sole assembly would be made of the same material as the primary sole part.

In one embodiment the tertiary sole part may form up to 50% of the ground contacting surface of the article of footwear, where primary sole part may form the remaining 50% of the ground contacting surface of the article of footwear. Thus, the ground contacting surface of the article of footwear and/or the sole assembly may be partly the tertiary sole part and partly the primary sole part. The sole assembly may be an assembly of the primary sole part, secondary sole part, tertiary sole part, quaternary sole part, or any subsequent sole part. The sole assembly may be the part of the article of footwear that is between the ground and the upper, during use.

The attachment area may also be on a peripheral part of the primary sole part, where the attachment area may have a vertical attachment area that may have a surface area that has third normal, where the third normal may be orthogonal to a vertical axis.

In one embodiment the secondary sole part may be enclosed by the primary sole part, so that the second sole part cannot be seen or accessed from the outside of the article of footwear. This may e.g. be understood that the second sole part cannot be accessed without penetrating the primary sole par cannot be seen and/or the upper. Thus, the primary sole part and/or the ground facing surface of the upper may enclose the secondary sole part and/or the first, second or third volume, so that the space which the injected material expands into is closed from all sides. This may therefore mean that the first volume is a closed volume, where one part of the volume is closed by the upper, and the remaining closure of the volume may be obtained by the primary sole part. In other words, the primary sole part may define the outer surface of the sole assembly of the article of footwear. This may mean that the secondary sole may be hidden by the primary sole part, and may therefore not be visible when the article of footwear has been produced.

In one exemplary embodiment wherein the peripheral surface of the primary sole part defines an attachment area adapted to accommodate a quaternary sole part, optionally where the quaternary sole part has a radial inwards facing surface for attachment to the peripheral surface and a outwards facing surface. The attachment area may also be on a peripheral part of the primary sole part, where the attachment area may have a vertical attachment area that may have a surface area that has third normal, where the third normal may be orthogonal to a vertical axis. The quaternary sole part may be a trim that may extend along the peripheral part of the primary sole part, where the trim may be of a different material than the primary sole part. The trim may e.g. made out of leather, rubber, or other suitable material. The trim may extend along the entire periphery of the primary sole part, creating an uninterrupted trim along the periphery of the primary sole part. Thus, the trim may be a closed line around the periphery of the primary sole part.

The quaternary sole part may define the terminal peripheral part of the first sole part, when attached to the primary sole part. Thus, the quaternary sole part may abut the side wall of the upper when the secondary sole part is injected, so that the quaternary sole part closes off the first volume relative to the ground facing part of the upper.

In one exemplary embodiment the first foot facing surface defines a third volume, where the third volume is in the heel area of the primary sole part, and/or where the third volume has a larger cross-sectional height than the first volume in the forefoot area and/or the arch area. The third volume may extend into the heel of the primary sole part, where distance from the ground facing surface of the upper and the foot facing surface of the heel is larger than e.g. in the arch and/or the forefoot area. Thus, the third volume may create a part where a thick layer of secondary material may be positioned below the heel of the user, to increase the shock absorption during the heel strike during a gait. Thus, the height of the secondary material in the heel area may be larger than the height of the secondary material in the arch area and/or the forefoot area. The height may be seen as the distance between the ground facing surface of the upper and the foot facing surface of the primary sole part.

In one exemplary embodiment the third volume is defined by a heel opening in the heel area of the primary sole part, where the heel opening in a first end is open into the first volume and in a second end is closed. The third volume may be a heel cavity, where the cavity is in one end closed at the foot facing part by the foot facing surface of the primary sole part, and in the opposite end (foot facing end) is open into the first volume of the primary sole part. The heel cavity may be closed to the medial side, back side, front side and lateral side by side walls that are formed in the primary sole part. The heel area may be an area that extends from the heel end of the sole towards the arch area of the sole assembly.

In one exemplary embodiment the heel opening comprises at least one support element that connect from one side wall of the heel opening to a second side wall of the heel opening. The support elements may be integrated in the primary sole part inside the heel, cavity and/or third volume. The support element may be a support beam, or a plurality of support beams that extend from one side wall of the heel cavity/volume in a diagonal direction to another side wall of the heel cavity/volume, where the support element may provide an increased stability in the side wall of the heel element. The support arm may be capable of providing structural strength to the side wall, allowing the side wall to maintain its form, and to reduce the risk that the side wall will buckle or bend when a force is applied to the heel. The support element may be attached to at least one side wall, and/or at least one bottom wall of the heel element, cavity and/or the third volume. The heel opening may comprise two or more support elements, where the support elements are arranged at a distance from each other at the connection to the side wall of the heel cavity.

In one exemplary embodiment the first volume extends from a heel end of the primary sole part to the toe end of the primary sole part. The secondary sole part may be arranged to extend the entire length of the sole assembly and/or the article of footwear from the front end to the back end. The secondary sole part may extend uninterrupted along the heel part, the arch part and the forefoot part, so that the secondary sole part may provide dampening and/or shock absorption along the entire length of the sole assembly, from the heel end towards the toe end. Optionally, the secondary sole part may extend the entire width of the sole assembly, from the toe end towards the sole end creating a dampening element between the first sole part and the second sole part along the entire width and length of the sole assembly.

Within the understanding of the present description, the first sole part may be an outsole for an article of footwear, such as a shoe, and/or where the second sole part may be a midsole for an article of footwear, such as a shoe.

In one exemplary embodiment the second ground facing surface comprises a ground contacting surface. The ground contacting surface of the primary sole part may be the lowest part of the article of footwear, i.e. the outermost part of the primary sole part. The ground facing surface may comprise a pattern, treads or other surface elements that are configured to increase traction, friction of the article of footwear.

In one exemplary embodiment the ground contacting surface is in a heel area and/or a forefoot area. The primary sole part may have one or more areas where the primary sole part is adapted to come into contact with the ground during use. The area of ground contact may e.g. be in the forefoot area and/or the heel area. In one embodiment, the ground contacting surface of the primary sole part may be in the forefoot area and the heel area, where the forefoot area and the heel area are the primary contact points between the article of footwear and the ground.

In one exemplary embodiment a tertiary sole part surrounds a peripheral area of the ground contacting surface. The peripheral part of the ground contacting surface of the primary sole part may be positioned at a distance from the peripheral edge of the primary sole part, where an attachment area may be positioned between the peripheral edge of the primary sole part and the peripheral edge of the ground contacting surface. The ground contacting surface may be at a lower height than the attachment area, allowing a layer of a tertiary layer to be positioned on the attachment area, between the peripheral edge of the primary sole part and the peripheral edge of the ground contacting surface. This allows the peripheral part of the primary sole part to be provided with a tertiary sole part that can be seen from the side of the article of footwear, where the tertiary sole part may eg provide a different aesthetic look than the material of the primary sole part, e.g. when the tertiary sole part is a layer of leather. In a first area of the ground facing surface of the primary sole part the primary sole part is the outermost layer of the sole assembly, while in a second area, different from the first area, the tertiary sole part may be the outermost layer. The height of the primary sole part may be seen as the height from the ground or a plane surface, when the article of footwear and/or the sole assembly is positioned on the plane surface. Thus, the height may be seen in a vertical direction from the ground and upwards.

In one exemplary embodiment the primary sole part comprises a peripheral boundary, where the peripheral boundary abuts an outer surface of the upper. The peripheral boundary may have an attachment area, where the attachment area may have one or more attachment areas, where the attachment surface may be adapted to attach a sole part, such as a tertiary sole part. The tertiary sole part may e.g. be a leather part, or other types of parts that may be aesthetically pleasing. The peripheral boundary may also comprise an inner contact area, which faces an upper of a shoe, where the inner contact area may close off the first volume, or a volume adapted to receive injected material, ensuring that the injected material is not visible from the outside of the shoe, in the area between the peripheral boundary and the upper.

In accordance with the description there is further provided a primary sole part having; a first foot facing surface defining a first volume for receiving an injected material in a cross sectional area between the first proximal surface (foot facing surface) and the first distal surface of the upper; a second ground facing surface; and a peripheral surface, where the first foot facing surface is configured to abut a first ground facing surface of an upper of an article of footwear, and configured to receive a injected sole material extending between the first ground facing surface of the upper and the foot facing surface of the primary sole part.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 shows a perspective view of a primary sole part 10, where the primary sole part 10 comprises a forefoot part 2, and arch part 3 and a heel part 4, and a peripheral edge 5, which is adapted to surround the periphery of the primary sole part 10. The primary sole part comprises a ground facing surface 6 and an upper facing surface 7, where the upper facing surface 7 comprises a first volume 42 as well as a second volume 9, and a third volume 11. The second volume 9 may be in the form of a plurality of cavities 9, where the cavities 9 are adapted to increase the surface area of the upper facing surface 7, where the cavities are configured to receive an injected material of a secondary sole part 12. The third volume 11 may be positioned in the heel part 4 of the primary sole part 10, where the third volume 11 may be adapted to receive a volume of injected material, where the thickness of the injected material is higher than in an forefoot part 2, and an arch part 3. The third volume 11 and/or the heel part 4 may comprise one or more support elements 13, where the support elements extend across the third volume from one side wall 15 towards a second side wall 17 of the heel part 4.

Figure 2:
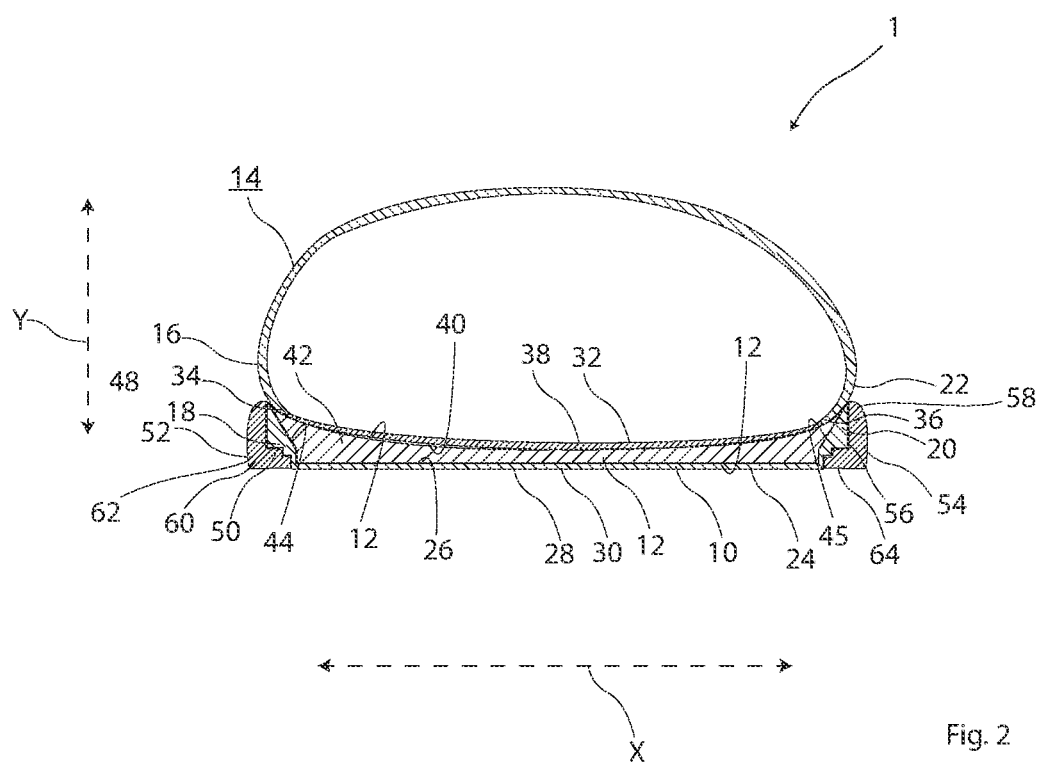
FIG. 2 shows a transverse sectional view of a forefoot part of an article of footwear.

FIG. 2 shows a sectional view of a forefoot part of an article of footwear 1 in the form of a shoe, where the shoe comprises a sole assembly comprising a primary sole part 10 and a secondary sole part 12, and an upper 14. A medial periphery 18 of the primary sole part 10 extends from a medial side 16 of the upper 14 in a transverse direction along the axis X, where a lateral periphery 20 abuts a lateral side 22 of the upper 14. The primary sole part comprises a ground facing surface 24 and a upper facing surface 26, where the ground facing surface 24 provides a ground contacting surface 28 in a central part 30 of the primary sole part 10.

The upper 14 comprises an insole 32, which is attached to the medial lower end 34 and the lateral lower end 36 of the upper 14. The insole 32 has a foot facing part 38 and a ground facing part 40, where the ground facing part 40 may be seen as the ground facing surface of the upper 14.

The primary sole part 10 defines a first volume 42, where the first volume 42 may be seen as a cubic space which is defined to the sides by the inner surface 44 of the medial periphery 18 as well as the inner surface 45 of the lateral periphery 20, and the upper facing surface 26 to the bottom. When the upper has been positioned in its current position, the ground facing surface of the upper 14 defines an upper boundary of the first volume 42.

The secondary sole part 12 extends into the first volume 42 of the first sole part 10, where the secondary sole part extends in a vertical direction Y between the ground facing surface of the upper 14 and the upper facing surface 26 of the primary sole part. The secondary sole part 12 may comprise an injected material where the injected material is adapted to expand inside the first volume 42 so that the injected material fills out the entire first volume, so that the first volume 42 may be seen as a mould for the secondary sole part 12.

The peripheral part 18, 20 of the primary sole part 10 comprises an attachment area 48, where the attachment area 48 may have one or more attachment surfaces 50, where the attachment surfaces 50 may be adapted to attach a tertiary sole part 52 and/or a quaternary sole part 54. The tertiary sole part 52 may e.g. be a ground facing layer of a material that is different from the material of the primary sole part 10, such as leather, where the tertiary sole part may surround the ground contacting surface 28 of the forefoot part, or may alternatively extend across the entire forefoot part 2 and/or the arch part in a transverse direction X, so that the tertiary part comprises the ground contacting surface of the forefoot part 2 of the primary sole part. The quaternary sole part 54 may be attached to a side wall 56 of the peripheral part 46 of the primary sole part 10, where a trim edge 58 may be attached to the primary sole part 10, providing e.g. an predefined aesthetic look to the primary sole part 10.

The tertiary sole part 52 and the quaternary sole part 54 may be separate part, that may be attached to each other to create a joined sole part 60, or may constructed from one material to define a side surface 62 and a bottom surface 64 of the sole assembly. The quaternary and/or the tertiary sole part may e.g. be made out of a leather.

Figure 3:
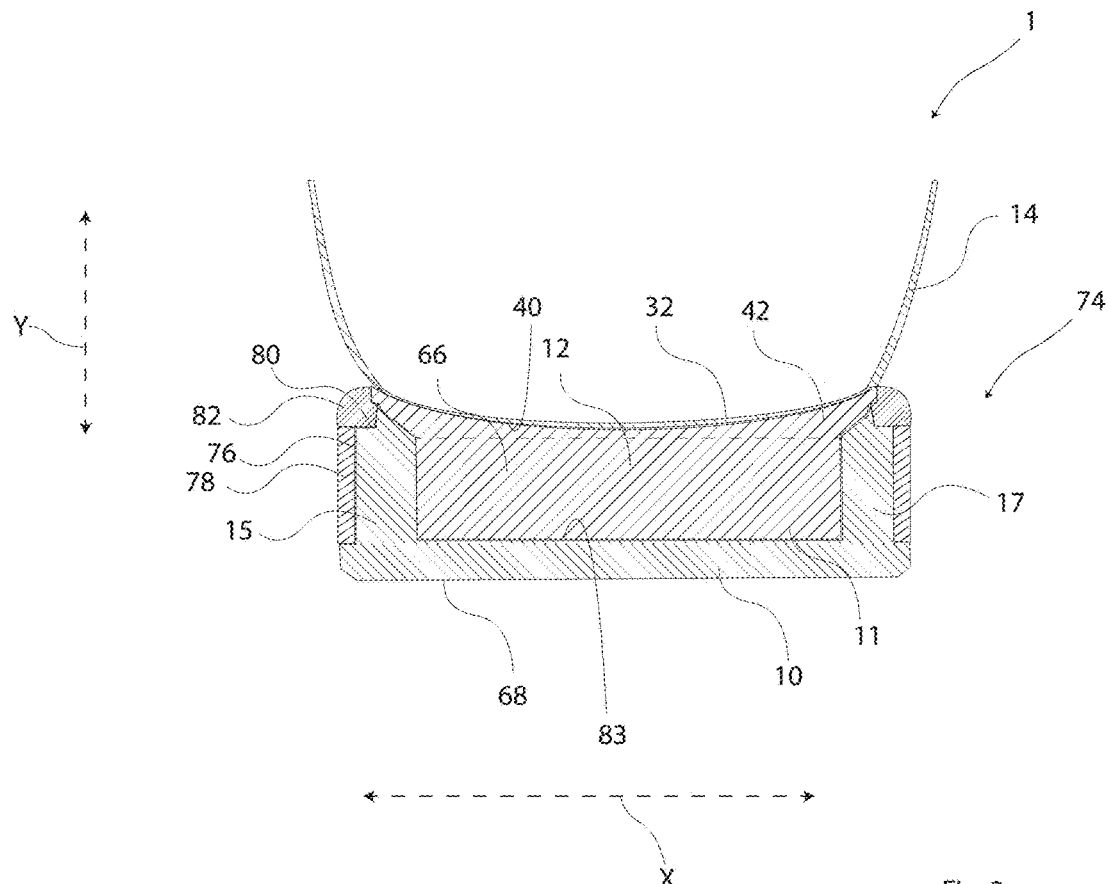
FIG. 3 shows a transverse sectional view of a heel part of an article of footwear.

FIG. 3 shows a cross sectional view of a heel part 4 of an article of footwear 1, where the heel part 4 comprises a heel 74, which may raise the upper 14 from the ground relative to the forefoot part 2, an upper 14 having an insole 32, where a primary sole part 10 is attached to the upper 14 using the secondary sole part 12, where the secondary sole part may be injected into a first volume 42. The first volume 42 in the heel part 4, may be constituted of the first volume 42, as well as a third volume 11, which extends into a heel cavity 66, which is defined by the side walls 15 and 17 of the heel cavity 66. The primary sole part 10 in the heel area 4 may have a ground contacting surface 68, which may extend along the entire ground facing part 70 in a transverse direction X of the heel part 4. A side wall 72 of the heel 74 may comprise a heel attachment area 76, where a layer of material 78 may be attached to the attachment area 76 to give the heel 74 a predefined aesthetic look. The layer of material 78 may e.g. be a layer of leather. The side wall 72 may also comprise a second attachment area 80, where a second material 82 may be attached to the second attachment area 80 to create a predefined aesthetic look for the shoe. The second material may e.g. be a leather.

The first volume 42 and the third volume 11 may be in fluid communication with each other, allowing the secondary sole part 12 to extend from the ground facing surface 40 of the insole 32 towards an upper facing surface 83 of the heel cavity 66, and from a first side wall 15 to the second side wall 17, filling out the heel cavity 66 and thereby the first volume 42 and the third volume 11. The height of the secondary sole part 12 in the heel area 4 is larger than the height of the secondary sole part 12 in the forefoot area 2 (as seen in FIG. 2) which means that the secondary sole part 12 in the heel area 4 is capable of absorbing more force than the forefoot area.

The secondary sole part 12 may be made out of a material that is softer than the material of the primary sole part 10, where the secondary sole part may be seen as a shock absorbing part of the sole assembly.

Figure 4:
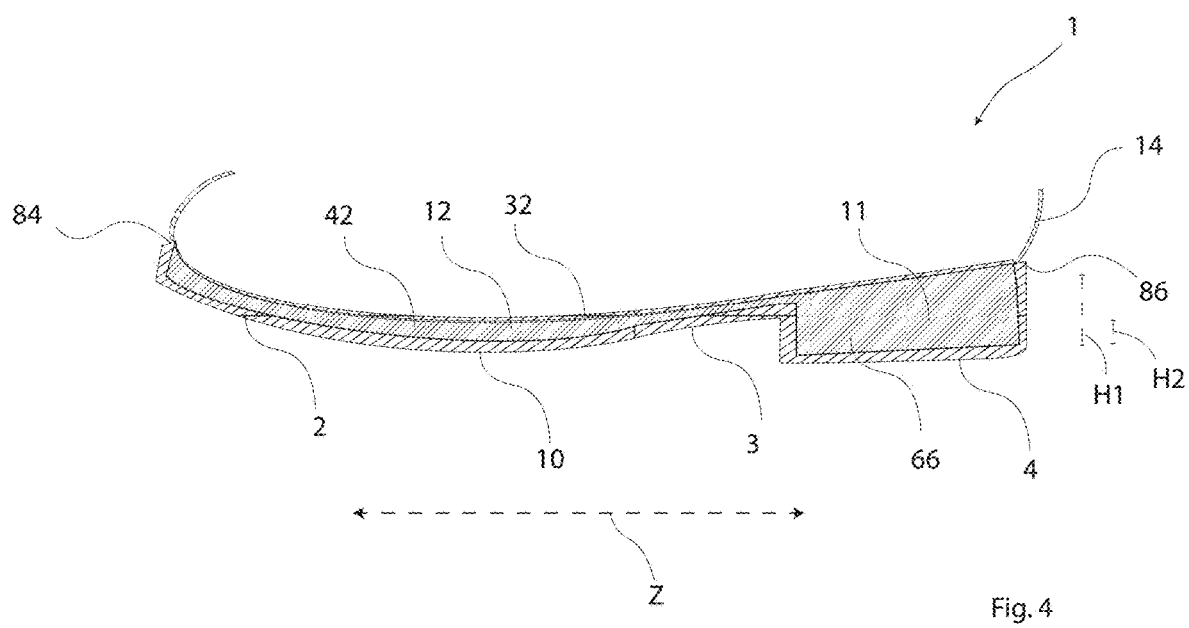
FIG. 4 shows a longitudinal sectional view of an article of footwear.

FIG. 4 shows a cross sectional view of an article of footwear 1, taken along a longitudinal length of the article of footwear. The primary sole part 10 extends from a front end 84 of the shoe 1 towards a heel end 86 of the shoe 1, where the upper 14 and the insole 32 are attached to the primary sole part 10 via the secondary sole part 12. The article of footwear has a forefoot part 2, an arch part 3 and a heel part 4, where the secondary sole part 12 extends uninterrupted from the front end 84 to the heel end 86, creating a dampening layer that extends between the primary sole part 10 and the upper 14 along the entire longitudinal length Z of the shoe. As may be seen here, the secondary sole part 12 in the heel part 4 has a height H1 that is larger than the height H2 of the secondary sole part in the forefoot part 2 of the shoe 1, where the secondary sole part enters the heel cavity 66 and/or the third volume 11 of the sole assembly.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 Article of footwear
2 Forefoot part
3 Arch part
4 Heel part
5 Peripheral edge
6 Ground facing surface
7 Upper facing surface
8
9 Second volume
10 Primary sole part
11 Third volume
12 Secondary sole part
13 Support element
14 Upper
15 Side wall of heel part
16 Medial side of upper
17 Side wall of heel part
18 Medial periphery
20 Lateral periphery
22 Lateral side of upper
24 Ground facing surface
26 Upper facing surface
28 Ground contacting surface
30 Central part of primary sole part
32 Insole
34 Medial lower end
36 Lateral lower end
38 Foot facing part
40 Ground facing part
42 First volume
44 Inner surface
45 Inner surface
46 Peripheral part
48 Attachment area
50 Attachment surface
52 Tertiary sole part
54 Quaternary sole part
56 Side wall
58 Trim edge
60 Joined sole part
62 Side surface
64 Bottom surface
66 Heel cavity
68 Ground contacting surface
70 Ground facing part
72 Side wall
74 Heel
76 First heel attachment area
78 Second material
80 Second heel attachment area
82 Second material
84 Front end
86 Heel end

The invention claimed is:

1. An article of footwear obtained by direct injection processing, the article of footwear comprising:
   an upper having a ground-facing surface;
   a primary sole part having a first foot-facing surface, a peripheral surface, a first ground-facing surface, and a first volume for receiving an injected material, wherein the first volume is defined by a cross-sectional area between a first proximal surface of the primary sole part, a first distal surface of the upper, and an inner surface of a peripheral side wall; and
   a secondary sole part having a second foot-facing surface and a second ground-facing surface, the secondary sole part extending between the ground-facing surface of the upper and the first foot-facing surface of the primary sole part,
   wherein the primary sole part comprises a heel area defining a third volume, a height of the third volume being greater than a height of the first volume in a forefoot area or an arch area,
   wherein the third volume is in fluid communication with the first volume,
   wherein the secondary sole part extends uninterrupted along the heel area, the arch area, and the forefoot area, and
   wherein the secondary sole part is formed of the injected material and is configured to attach the primary sole part to at least a part of the upper extending beyond an insole.

2. The article of footwear of claim 1, wherein the primary sole part further defines one or more cavities for receiving the injected material.

3. The article of footwear of claim 1, wherein the first volume of the primary sole part defines a mold cavity of the secondary sole part.

4. The article of footwear of claim 3, wherein the secondary sole part is direct injection molded into the first volume.

5. The article of footwear of claim 1, wherein the second foot-facing surface of the secondary sole part is attached to the ground-facing surface of the upper and the second ground-facing surface of the secondary sole part is attached to the first foot-facing surface of the primary sole part.

6. The article of footwear of claim 1, wherein the second ground-facing surface of the secondary sole part comprises an attachment area configured to accommodate a tertiary sole part, wherein the tertiary sole part comprises a third foot-facing surface and a third ground-facing surface.

7. The article of footwear of claim 1, wherein the peripheral surface of the primary sole part defines an attachment area configured to accommodate a quaternary sole part, wherein the quaternary sole part comprises an inward-facing surface for attachment to the peripheral surface and an outward-facing surface.

8. The article of footwear of claim 1, wherein the third volume is a cavity in the heel area of the primary sole part, the cavity being open into the first volume at a first end of the cavity and being closed at a second end of the cavity.

9. The article of footwear of claim 8, wherein the cavity comprises support elements that connect from a first side wall of the cavity to a second side wall of the cavity.

10. The article of footwear of claim 1, wherein the first volume extends from a heel end of the primary sole part to a toe end of the primary sole part.

11. The article of footwear of claim 1, wherein the first ground-facing surface of the primary sole part comprises a ground contacting surface.

12. The article of footwear of claim 11, wherein the ground contacting surface comprises a heel area and a forefoot area.

13. The article of footwear of claim 12, wherein a tertiary sole part surrounds a peripheral area of the ground contacting surface.

14. A primary sole part configured for direct injection processing of footwear, the primary sole part comprising:
   a first foot-facing surface, a peripheral surface, a first ground-facing surface, and a first volume for receiving an injected material, wherein the first volume is defined by a cross-sectional area between a first proximal surface of the primary sole part, a first distal surface of an upper of an article of footwear, and an inner surface of a peripheral side wall,
   wherein the first foot-facing surface of the primary sole part is configured to abut a ground-facing surface of the upper,
   wherein the first volume is configured to receive an injected sole material extending between the ground-facing surface of the upper and the foot-facing surface of the primary sole part,
   wherein the primary sole part comprises a heel area defining a third volume, a height of the third volume being greater than a height of the first volume in a forefoot area or an arch area,
   wherein the third volume is in fluid communication with the first volume,
   wherein the primary sole part is configured to receive the injected material to extend uninterrupted along the heel area, the arch area, and the forefoot area, and
   wherein the secondary sole part is formed of the injected material and is configured to attach the primary sole part to at least a part of the upper extending beyond an insole.

* * * * *